US011084044B2

United States Patent
Verhoff (10) Patent No.: US 11,084,044 B2
(45) Date of Patent: Aug. 10, 2021

(54) SEDIMENT BUSTER FOR WATER CONTAINER FLUSHING SYSTEM INCLUDING SEDIMENT SEPARATOR, AND ASSOCIATED METHODS

(71) Applicant: John Verhoff, Bonita springs, FL (US)

(72) Inventor: John Verhoff, Bonita springs, FL (US)

(73) Assignee: Nerd Concepts Inc., Naples, FL (US)

( * ) Notice: Subject to any disclaimer, the term of this patent is extended or adjusted under 35 U.S.C. 154(b) by 90 days.

(21) Appl. No.: 16/374,393

(22) Filed: Apr. 3, 2019

(65) Prior Publication Data

US 2019/0283037 A1    Sep. 19, 2019

Related U.S. Application Data

(63) Continuation-in-part of application No. 15/924,230, filed on Mar. 18, 2018, now Pat. No. 10,775,076.

(51) Int. Cl.
*B02C 19/18* (2006.01)
*F24H 9/00* (2006.01)

(52) U.S. Cl.
CPC ......... *B02C 19/18* (2013.01); *F24H 9/0042* (2013.01)

(58) Field of Classification Search
CPC .................................................... B02C 19/18
See application file for complete search history.

(56) References Cited

U.S. PATENT DOCUMENTS

| | | | | |
|---|---|---|---|---|
| 2,820,467 A * | 1/1958 | Mattich | .................... | E03C 1/304 134/168 R |
| 3,156,584 A * | 11/1964 | Yurdin | .................. | B08B 9/0321 134/17 |
| 4,063,317 A * | 12/1977 | Santore | .................... | E03C 1/304 4/255.01 |
| 5,249,311 A * | 10/1993 | Rau | ......................... | E03C 1/306 15/406 |
| 5,494,527 A * | 2/1996 | Ludwig | ................. | F24H 9/0042 134/3 |
| 5,996,597 A * | 12/1999 | Gallo | ........................ | B08B 3/02 134/102.2 |
| 6,041,611 A * | 3/2000 | Palmer | .................. | B08B 9/0325 137/240 |
| 6,442,956 B1 * | 9/2002 | Herren | .................. | F24F 13/222 62/150 |

(Continued)

*Primary Examiner* — Nathaniel Herzfeld (74) *Attorney, Agent, or Firm* — Collaborative IP; Paul Joseph Ditmyer (57) ABSTRACT

A sediment buster is used for water heater draining. The sediment buster includes a main body defining a conduit and configured to be coupled to a drain outlet of a tank of the water heater. The conduit is configured to transport a fluid into the drain outlet to break up sediment accumulated at the drain outlet inside the tank. A first connector at an end of the main body is configured to be coupled to the drain outlet of the tank, and a second connector is at an opposite end of the main body. An inlet valve is positioned on the main body and configured to receive the fluid to be sent into the drain outlet via the conduit and the first connector. A shut-off valve is positioned on the main body between the inlet valve and the second connector to selectively regulate the direction of flow of the fluid within the conduit from the inlet valve. A fluid supply device is coupled to the inlet valve for selectively supplying the fluid to be sent into the drain outlet via the conduit and the first connector.

2 Claims, 5 Drawing Sheets

(56) References Cited

U.S. PATENT DOCUMENTS

| | | | | |
|---|---|---|---|---|
| 6,708,717 B1* | 3/2004 | Coogle | ............... | B08B 9/0321 |
| | | | | 134/166 C |
| 8,646,474 B2* | 2/2014 | Pearson | ............... | F28F 17/005 |
| | | | | 137/15.04 |
| 9,975,152 B1* | 5/2018 | McClarren | ............ | F24F 13/222 |
| 2006/0042292 A1* | 3/2006 | Kimbrough | ........... | F24F 13/222 |
| | | | | 62/285 |
| 2011/0308628 A1* | 12/2011 | Nugent | ................... | F24H 9/16 |
| | | | | 137/13 |

* cited by examiner

SEDIMENT BUSTER FOR WATER CONTAINER FLUSHING SYSTEM INCLUDING SEDIMENT SEPARATOR, AND ASSOCIATED METHODS

RELATED APPLICATIONS

This application is a Continuation-in-Part Application of U.S. application Ser. No. 15/924,230 filed Mar. 18, 2018 titled "WATER CONTAINER FLUSHING SYSTEM INCLUDING SEDIMENT SEPARATOR, SEDIMENT BUSTER AND ASSOCIATED METHODS" which is incorporated herein in its entirety by reference.

FIELD OF THE INVENTION present invention relates to the field of water storage, and more particularly, to water heaters and flushing systems and methods.

BACKGROUND OF THE INVENTION

Figure 1:
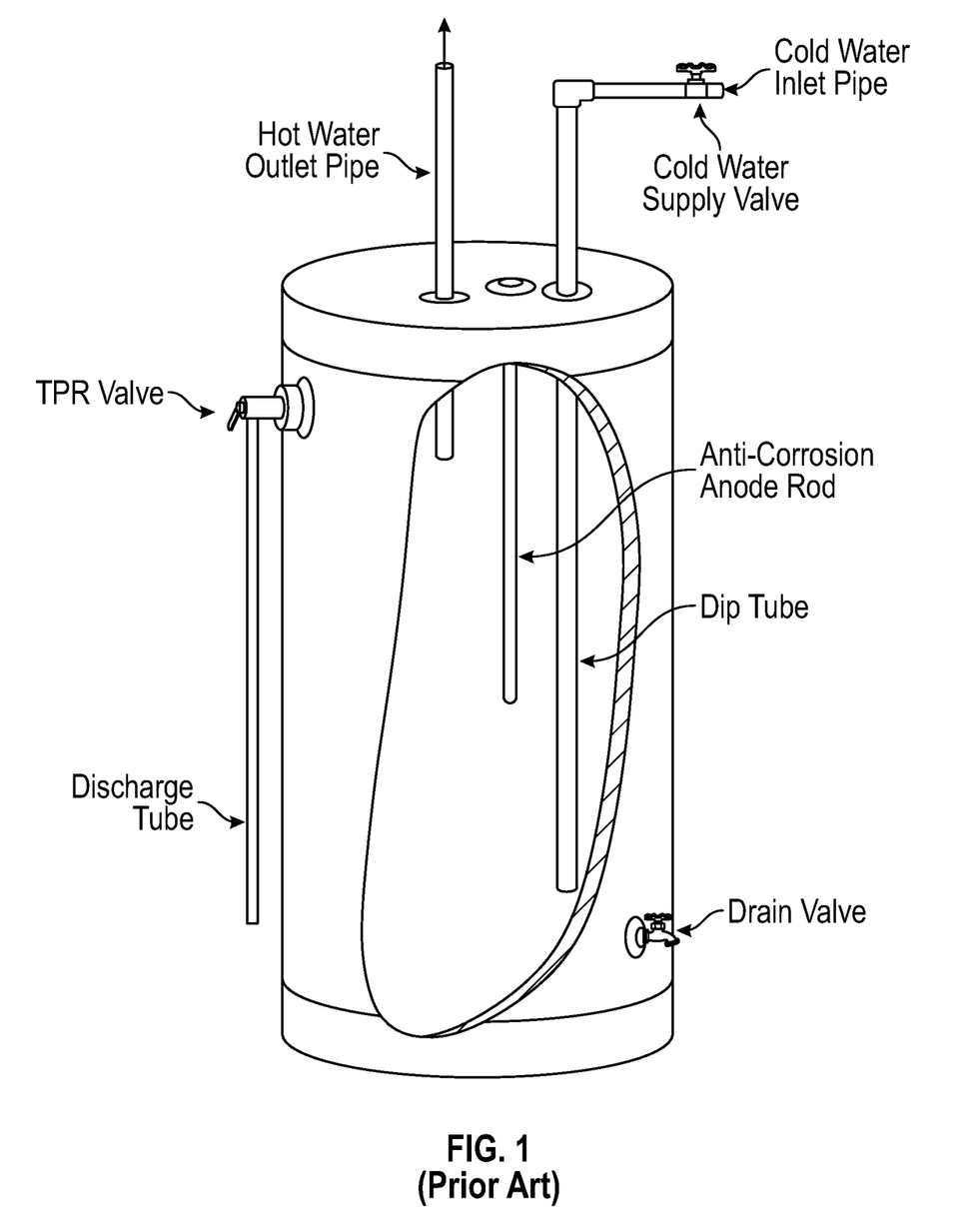
FIG. 1 is a schematic diagram illustrating a typical water heater according to the prior art.

Referring to FIG. 1, typical electric and gas water heaters have a number of components in common, including the tank, the drain valve, the temperature and pressure relief (TPR) valve and associated discharge or overflow tube, an internal anode, dip tube and pipes for cold water inlet and hot water outlet. As supply valve is also typically included for shutting off water to the tank. In both cases, the internal tank is wrapped with insulating material to keep the water hotter longer. Heating elements and thermostats are included, although not shown.

A water heater needs regular maintenance for maintaining performance. A water heater flush is intended to clear out sediment and minerals, such as calcium and lime, that could impede the water heater's performance. Most manufacturers recommend flushing a water heater at least once per year, but this need could also depend on water quality in the region. For example, the harder the water is in the region, the more likely a flush is needed frequently.

Over time, these sediment and mineral deposits collect at the base of a water heater tank. These deposits can build up to a thick, hard coating. This coating diminishes the transfer of heat from the burner to the water in the tank, and eventually also causes corrosion. Additionally, deposits can break free, clogging faucets, pipes, and the valve that is used to flush or empty the water heater tank.

In addition to decreased efficiency, leaving the sediment and minerals to build up in the water heater tank can lead to various other problems including, for example, loss of water pressure, and/or complete failure of the water heater.

Typically, the water heaters are flushed or cleaned utilizing an open flushing approach that includes opening the drain valve for a sufficient period of time until water runs clear. Unfortunately, clogs of sediment can often prevent draining, and the approach is not environmentally friendly as the gallons of sediment filled water are often drained to the yard or into some other container for disposal. Such approaches waste water and may create risks to users, bystanders, and to the environment in which they are used.

U.S. Published Application No. 2012/0118246 to Oberkorn et al. and titled "Sealed and self-contained tankless water heater flushing system" is directed to a sealed and self-contained tankless water heater flushing system including a holding basin, a submersible pump contained within the holding basin, a submersible pump hose, a filter system, a discharge hose for connecting the discharge opening to the water heater, and a filter hose for connecting the filter opening to the water heater.

However, there is a need for a water heater flushing system that is more environmentally friendly by conserving water and not contaminating the environment, that allows for the visual inspection and analysis of the sediment and minerals, and that can more easily break up a clog at the water heater drain.

This background section is intended to introduce the reader to various aspects of typical technology that may be related to various aspects or embodiments of the present invention, which are described and/or claimed below. This discussion is believed to be useful in providing the reader with background information to facilitate a better understanding of the various aspects and embodiments of the present invention. Accordingly, it should be understood that these statements are to be read in light of, and not as admissions of, the prior art.

SUMMARY OF THE INVENTION

It is an object of the present embodiments to provide a water heater flushing system that is more environmentally friendly by conserving water and not contaminating the environment, and that allows for the efficient and effective breaking up of the sediment and minerals that may have accumulated at a drain outlet of a water heater tank.

This and other objects, advantages and features in accordance with the present embodiments may be provided by a sediment buster for water heater draining, the sediment buster including a main body defining a conduit and configured to be coupled to a drain outlet of a tank of the water heater and configured to transport a fluid into the drain outlet to break up sediment accumulated at the drain outlet inside the tank. A first connector at an end of the main body is configured to be coupled to the drain outlet of the tank, and a second connector is at an opposite end of the main body. An inlet valve is positioned on the main body and configured to receive the fluid to be sent into the drain outlet via the conduit and the first connector. A shut-off valve is positioned on the main body between the inlet valve and the second connector to selectively regulate the direction of flow of the fluid within the conduit from the inlet valve. A fluid supply device is coupled to the inlet valve for selectively supplying the fluid to be sent into the drain outlet via the conduit and the first connector.

Additionally, and/or alternatively, the fluid supply device is a fluid pump or a compressed fluid supply.

Additionally, and/or alternatively, the first connector is an internally threaded and rotatable female connector configured to be threadingly connected to a drain port at the drain outlet of the tank.

Also, the first connector may be an externally threaded connector configured to be threadingly connected to the drain outlet of the tank. As such, the main body is configured to be used as the drain port for the tank of the water heater.

Another embodiment is directed to a sediment buster for water heater draining. The sediment buster includes a main body defining a conduit and configured to be coupled to a drain outlet of a tank of the water heater and configured to transport a fluid into the drain outlet to break up sediment accumulated at the drain outlet inside the tank. A first end of the main body is configured to be coupled to the drain outlet of the tank, and an inlet valve is positioned on the main body and configured to be receive the fluid to be sent into the drain outlet via the conduit and the first connector. A shut-off valve is positioned on the main body adjacent the inlet valve to direct flow of the fluid within the conduit from the inlet valve towards the drain outlet.

Additionally, and/or alternatively, a fluid supply device is coupled to the inlet valve for selectively supplying the fluid to be sent into the drain outlet via the conduit and the first connector. The fluid supply device may be a fluid pump or a compressed fluid supply.

Additionally, and/or alternatively, a connector at the first end of the main body may comprise an internally threaded and rotatable female connector configured to be threadingly connected to a drain port at the drain outlet of the tank.

Also, a connector at the first end of the main body may comprise an externally threaded connector configured to be threadingly connected to the drain outlet of the tank. Here, the main body is configured to be used as the drain port for the tank of the water heater.

Another embodiment is directed to a method of breaking up sediment accumulated at a drain outlet inside a tank (e.g. a water heater tank). The method includes: operating a sediment buster that includes a main body defining a conduit coupled at a first end to a drain outlet of the tank and configured to transport a fluid; coupling a fluid supply device to an inlet valve positioned on the main body and configured to receive the fluid to be sent into the drain outlet via the conduit; closing a shut-off valve positioned on the main body adjacent the inlet valve to direct flow of the fluid within the conduit from the inlet valve; operating a fluid supply device coupled to the inlet valve to supply the fluid into the drain outlet via the conduit to break up the sediment accumulated at the drain outlet inside the tank; operating the fluid supply device coupled to the inlet valve to stop the supply of the fluid into the drain outlet; and opening the shut-off valve to allow flow of fluid and sediment out a second end of the conduit.

Additionally, and/or alternatively, the fluid supply device comprises a fluid pump or a compressed fluid supply.

Additionally, and/or alternatively, operating the sediment buster comprises connecting the first end of the main body using an internally threaded and rotatable female connector to a drain port at the drain outlet of the tank.

Additionally, and/or alternatively, operating the sediment buster comprises connecting the first end of the main body using an externally threaded connector to the drain outlet of the tank. Here, the main body is used as the drain port for the tank.

The embodiments can also be used for other equipment, such as tankless water heaters, heat exchangers, boilers, condensers, and other equipment, where scale and sediment build-up is a problem.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The dimensions of layers and regions may be exaggerated in the figures for greater clarity.

Figure 2:
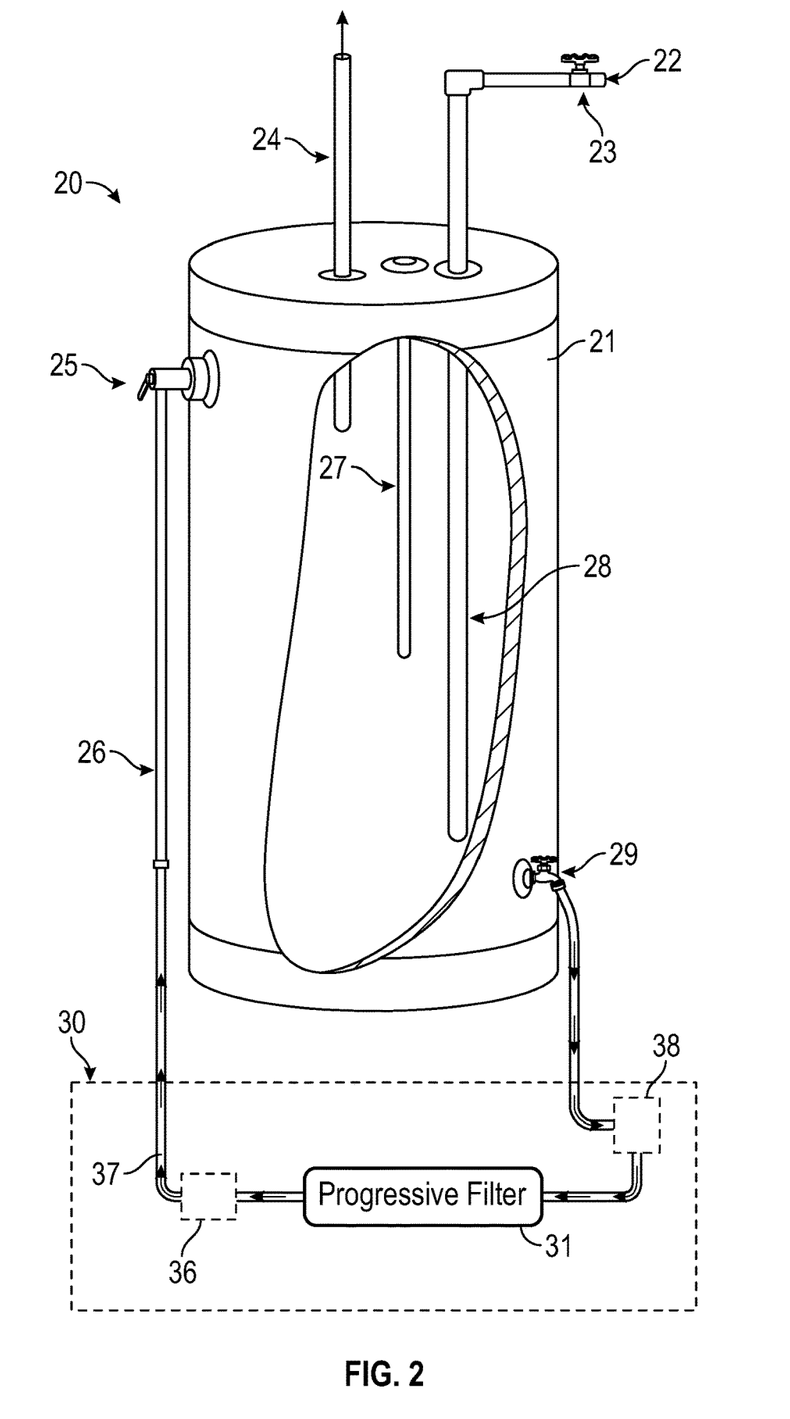
FIG. 2 is a schematic diagram illustrating an embodiment of the water heater flushing system, coupled with a water heater, in accordance with features of the present invention.
Figure 3:
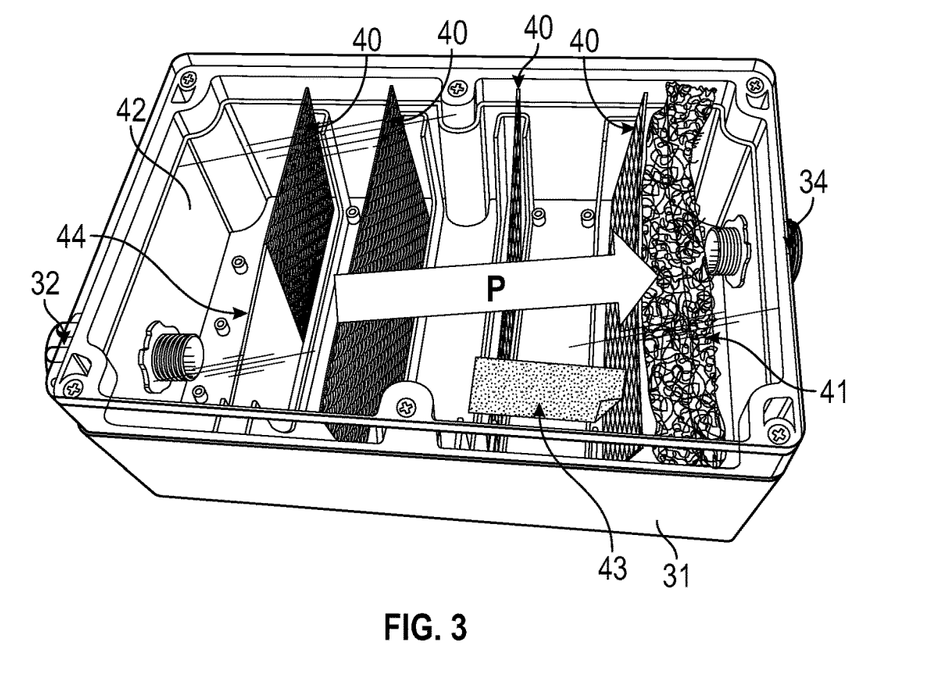
FIG. 3 is a more detailed view of an embodiment of the water heater flushing system including the internal components within the housing.
Figure 4:
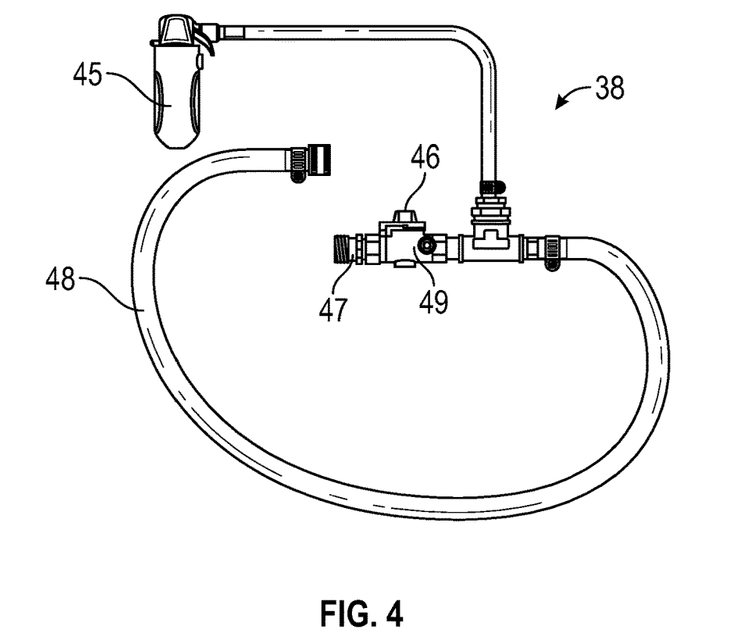
FIG. 4 is a schematic diagram illustrating an embodiment of the sediment buster of the water heater flushing system of FIG. 2.

Referring now to FIGS. 2-4, a water heater flushing system 30 will now be described. As illustrated, a water heater 20 includes a tank 21, with a cold water inlet 22 and associated valve 23, and a hot water outlet 24. A temperature and pressure relief (TPR) valve 25 and associated discharge tube 26 are included, as would be appreciated by those skilled in the plumbing field. Other features include a sacrificial anode 27, dip tube 28 associated with the cold water inlet 22, and a drain port 29. Various other standard features such as heating elements, controllers, and thermostats are not shown for ease of description.

The water flushing system 30 may include various components such as a filter housing 31 (Progressive Filter) having an inlet 32 at a first end and configured to be coupled to the drain port 29 of the water heater 20 (e.g. via an appropriate connection hose) and receive water therefrom, and an outlet 34 at a second end and configured to discharge water from the filter housing 31. The inlet 32 and outlet 34 may be typical hose connectors with external threads or an internally threaded collar. Of course, other connectors may also be used. Also, the inlet 32 and outlet 34 may be reversed, i.e. either end of the housing 31 may be used as the inlet or outlet.

Optionally, a water pump 36 may be coupled to the outlet 34 of the filter housing 31 (e.g. via a connection hose). The water pump 36 may be coupled within the system 30 using a connection hose 37, for example, configured to be coupled to a temperature and pressure relief (TPR) valve 25 (e.g. via the discharge tube 26) of the water heater 20 to recirculate the water back into the water heater tank 21 and define a waterless flushing process. The connection hose 37 may include a quick connection fitting configured for connection to the TPR valve 25 or discharge tube 26. The water pump 36 may also be integrated within the filter housing 31 in other embodiments.

Also optionally, a sediment buster 38 may be coupled to the inlet 32 of the filter housing 31 and configured to send a fluid (e.g. air or water) into the drain port 29 of the water heater 20, as will be described in greater detail below.

Referring now to the more detailed view of the filter housing 31 in FIG. 3, there are a series of filter elements 40 that are positioned and spaced apart within the housing transverse to a water flow path P defined between the inlet 32 and the outlet 34. The series of filter elements 40 are configured to separate solid impurities from the water according to different particle sizes (e.g. progressively different or finer particle sizes) in the water flow path P between the inlet 32 and the outlet 34. The solid impurities may be at least one of sediment and scale as would be appreciated by those skilled in this field.

The filter elements 40 may be removable, for example, so they can be replaced. The filter elements 40 may be mesh screens. The mesh screens may be stainless steel mesh screens. Also, a carbon filter 41 may be positioned in the filter housing 31 between the series of filter elements 40 and the outlet 34. In an embodiment, the series of filter elements 40 includes 4-5 stainless steel interchangeable mesh screens that separate the scale and sediment by size. For example, the size mesh may range from 5 microns (smallest) to ½ inch or vice versa. The carbon filter 41 may reduce smell, color and finer particles.

A viewing feature 42 is carried by the filter housing 31 and is configured to provide visual access to an interior of the filter housing 31 for inspection of separated solid impurities at each of the filter elements 40. The viewing feature 42 may be an openable lid connected to the housing, e.g. via a hinge and latch (not shown). Also, such a lid may be a transparent lid, as illustrated. The filter housing 31 and viewing feature 42 or lid may be watertight for pressures of at least 200 psi, for example. The transparent lid may include a solid impurities identification feature 43 such as a color or size identification chart that would aid the user in identifying and determining the type of minerals present in the water.

A water diverter 44 may be positioned between the inlet 32 and the series of filter elements 40, and is configured to disrupt a direct flow of water to the series of filter elements 40. The water diverter 44 may be a solid portion within a first filter element.

Referring more specifically to FIG. 4, the sediment buster 38 may include a fluid supply device 45, such as a compressed gas cartridge. A shut-off valve 46 is located on the main body 49 between the fluid supply device 45 and the connection 47 that leads to the inlet 32 of the filter housing 31 so that the fluid can be directly sent to the drain port 29 of the water heater 20 via hose 48, for example. The fluid supply device 45 may be a fluid pump (e.g. a hand pump) or compressed fluid supply, such as a $CO_2$ cartridge, for example.

All parts may be rated for hot water with temperatures in access of 220 degrees, and all parts may be rated for pressures in access of 200 psi.

Thus, a water heater flushing process begins with the cold water inlet for water heater being turned off. Once the inlet 32 and outlet 34 connections have been made, the TPR valve 25 lever should be opened. Then, the water heater drain port 29 is opened. If the water pump 36 is being used, then it will then draw the contaminated water through the filter housing 31 and series of filter elements 40 while cleaning it and allowing the water to circulate back into the tank 21 via the TPR valve. This allows the "Water Heater Flushing Process" to be waterless.

If there is no water flow from the drain port 29 then such would indicate sediment, scale, etc. buildup and would require a way to break it up. The sediment buster 38 may be optionally used by connecting it between the water heater drain port 29 and inlet side of the filter housing 31. The shut off valve 46 is located between the filter housing 31 inlet 32 and the entrance point for the fluid injection from the fluid supply device 45 to allow fluid flow only in the direction of the water heater 20. Once the fluid has entered the water heater 20 to bust up the sediment, then circulation may be tried again. This process may take a few times to clear enough sediment and allow drainage of the water.

The solid impurities may be analyzed via the viewing feature 42 of the filter housing 31. For example, the solid impurities may include rust flakes from the water pipes, sand grains, small pieces of organic matter, clay particles, or any other small particles in the water supply. White scale may indicate calcium hardness. Black, rust or sand may indicate decaying galvanized pipes or sediment in well water. Blue or gray chips may indicate a decaying dip tube. Black, orange or gray flakes may indicate a decaying anode rod. This information may be useful in determining what type of water filtration and/or purification system may be appropriate for the region. Again, the solid impurities identification feature 43 such as a color or size identification chart would aid the user in identifying and determining these and other types of minerals present in the water.

Once water passing through the housing filter is free from new contaminants than the water heater drain port 29 and the TPR valve can be closed and the water flushing system 30 is removed.

Figure 5:
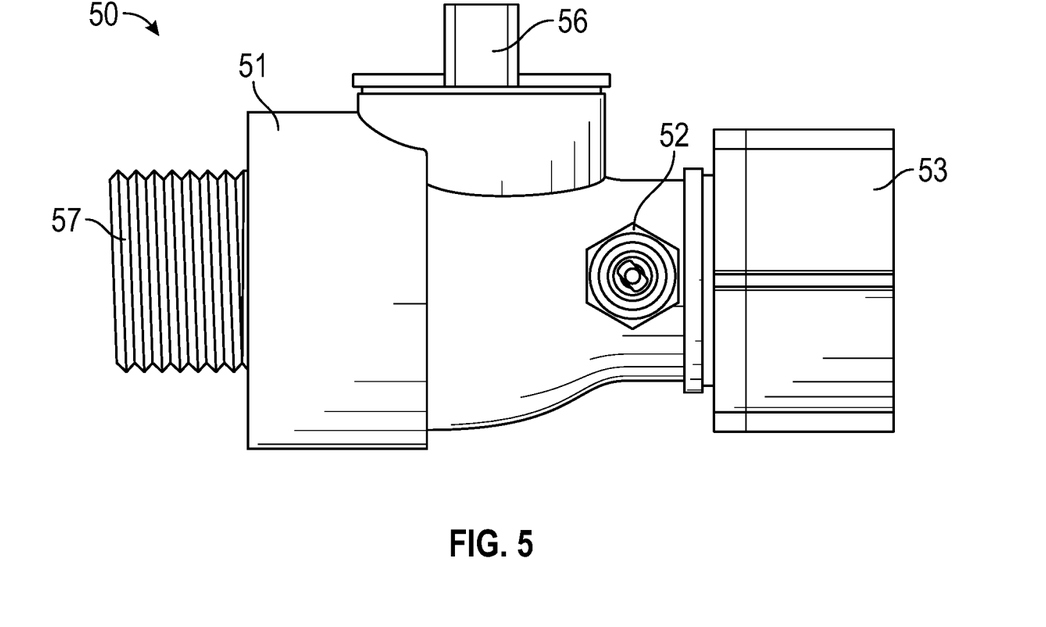
FIG. 5 is a side view of the main body of another embodiment of the sediment buster of the water heater flushing system of FIG. 2.
Figure 6:
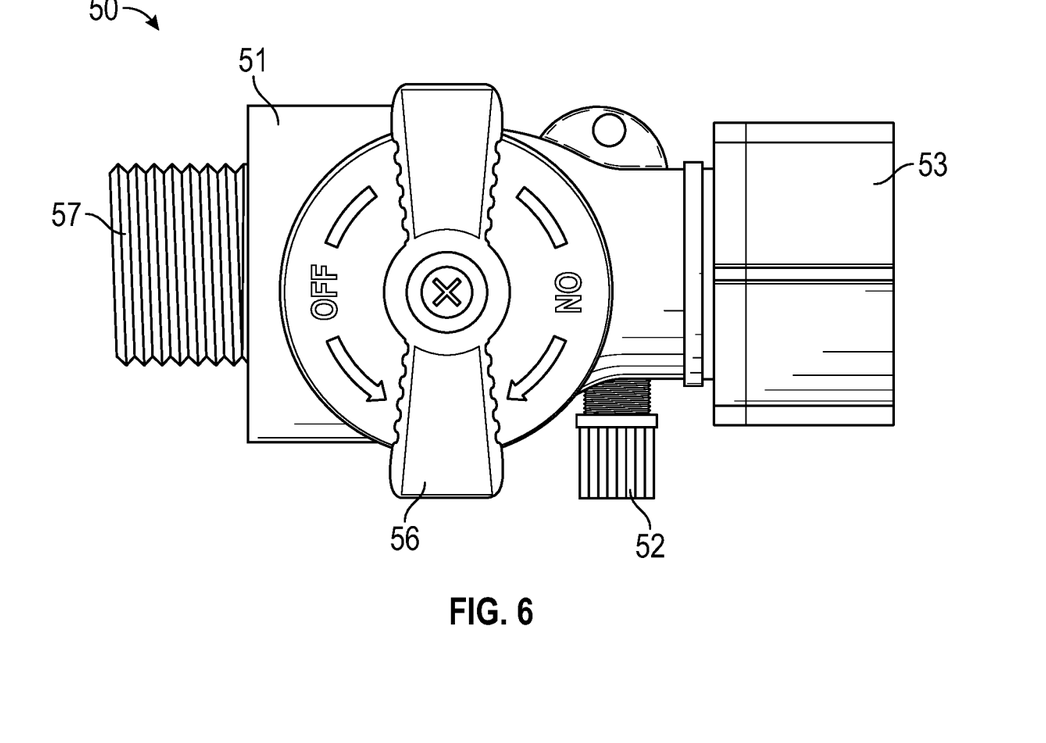
FIG. 6 is a top view of the main body of the embodiment of the sediment buster of FIG. 5.

Referring to additionally to FIGS. 5 and 6, another embodiment of the main body 50 of the sediment buster 38 will be described. FIG. 5 is a side view of the main body 50, and FIG. 6 is a top view thereof, of the embodiment of the sediment buster 38 of the water heater flushing system 30 (e.g. of FIG. 2). Such an embodiment of the main body 50 may be characterized as a more compact version relative to the main body 49 shown in FIG. 4.

The main body 50 includes a housing 51 that defines a conduit between a connector 57 (e.g., externally threaded male connector) and connector 53 (e.g., internally threaded and rotatable female connector). An inlet valve 52 (e.g., illustrated as a Schrader valve) is positioned in the housing 51 and configured to couple to the fluid supply device 45 (e.g., FIG. 4), such as a compressed gas cartridge. Other compressed or non-compressed liquids or gases may also be used as would be appreciated by the skilled artisan.

A shut-off valve 56 is located on the housing 51 between the inlet valve 52 and the connection 57 that leads to the inlet 32 of the filter housing 31. Thus, operating the shut-off valve 56 can selectively control the direction of the flow of fluid within the housing 51 from the fluid supply device 45. In this way, turning off the shut-off valve 56 results in the fluid from the fluid supply device 45 being directly sent through the housing 51 and out the connector 53 to the drain port 29 of the water heater 20 via a hose 48, for example, illustrated in FIGS. 2 and 4, and coupled to connector 53. The fluid from the fluid supply device 45 forcefully enters the drain port 29 of the water heater 20 to bust up the sediment, then draining or circulation through the filter housing 31 may be tried again.

Figure 7:
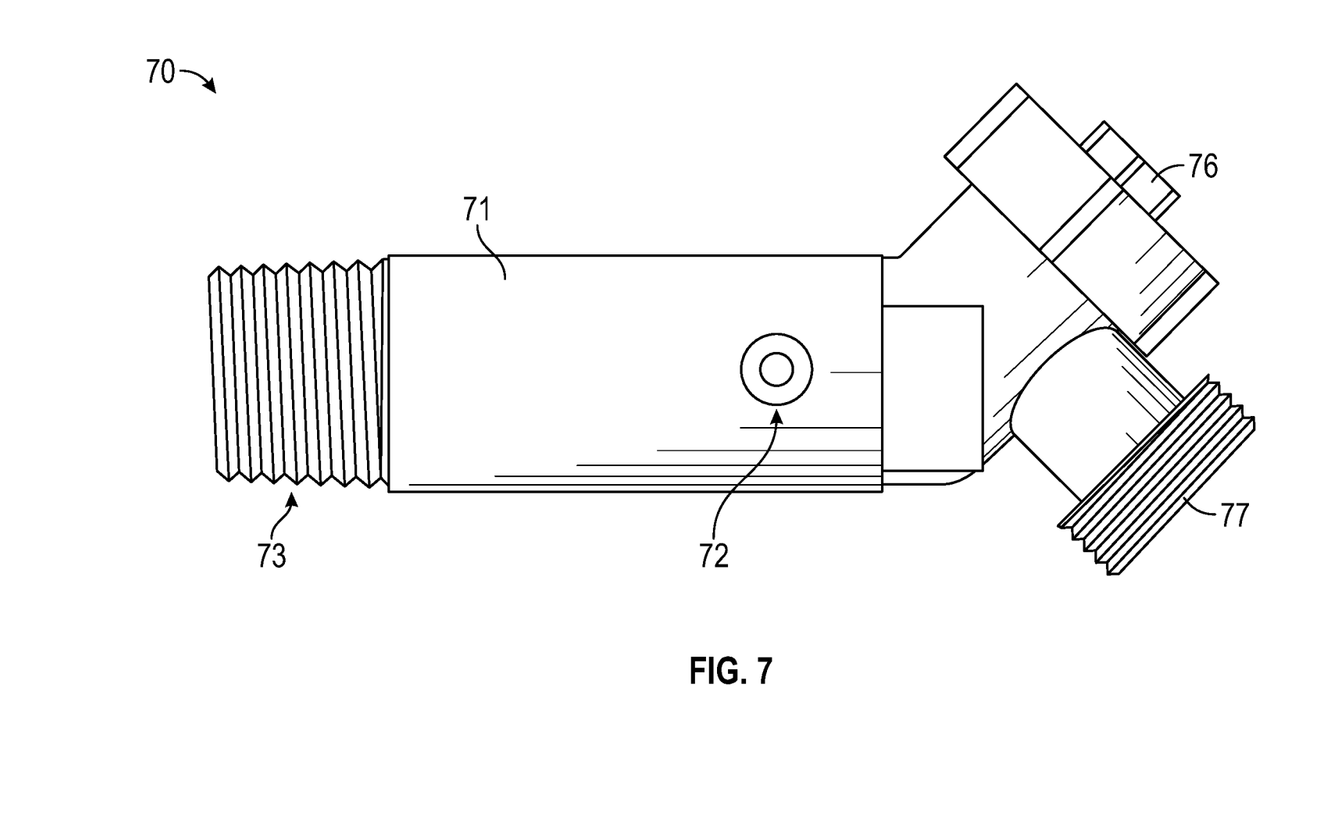
FIG. 7 is a side view of the main body (which operates as the water heater drain valve) of another embodiment of the sediment buster of the water heater flushing system of FIG. 2.

Referring to additionally to FIG. 7 another embodiment of the main body 70 of the sediment buster 38 will be described. FIG. 7 is a side view of the main body 70 of the embodiment of the sediment buster 38 of the water heater flushing system 30 (e.g. of FIG. 2). Such an embodiment of the main body 70 may be used as the drain port 29 of the water heater 20. This embodiment of the main body 70 may be used as an OEM (original equipment manufacturer) part for the water heater 20, or it may be retrofitted to an existing water heater in the home or business.

The main body 70 includes a housing 71 that defines a conduit between a connector 77 (e.g., externally threaded male connector) and connector 73 (e.g., externally threaded male connector for direct connection to a drain outlet of the water tank 21). An inlet valve 72 (e.g., illustrated as a Schrader valve) is positioned in the housing 71 and configured to couple to the fluid supply device 45 (e.g., FIG. 4). A shut-off valve 76 is located on the housing 71 between the inlet valve 72 and the connection 77 that may be coupled to the inlet 32 of the filter housing 31.

Operating the shut-off valve 76 can selectively drain water from the water tank 21 and/or control the direction of the flow of fluid within the housing 71 from the fluid supply device 45. In this way, keeping the shut-off valve 56 in the closed position results in the fluid from the fluid supply device 45 being directly sent through the housing 71 and out the connector 73 to the drain outlet of the water tank 21 coupled to connector 73. The fluid from the fluid supply device 45 forcefully enters the drain outlet of the water tank 21 to bust up the sediment, then draining the tank 21 or circulation through the filter housing 31 may be tried again.

The embodiments described above provide a water heater flushing system that is more environmentally friendly by conserving water and not contaminating the environment, and that allows for the visual inspection and analysis of the sediment and minerals. The embodiments may also provide a water heater flushing system that can more easily break up a clog at the water heater drain.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A sediment buster tool for water heater draining, the water heater including a tank that holds heated water under pressure, the sediment buster tool comprising:
   a main body defining a conduit and configured to be coupled to a drain outlet of the tank of the water heater and configured to transport a gas into the drain outlet to break up hard sediment accumulated at the drain outlet inside the tank;
   a first connector, comprising an internally threaded and rotatable female connector, at an end of the main body and configured to be coupled to an externally threaded drain port at the drain outlet of the tank;
   a second connector at an opposite end of the main body;
   an inlet valve positioned on the main body and configured to receive the gas to be sent into the drain outlet via the conduit and the first connector;
   a shut-off valve positioned on the main body between the inlet valve and the second connector to selectively regulate the direction of flow of the gas from the inlet valve, within the conduit, into the drain outlet, and then into the tank while breaking up the hard sediment accumulated at the drain outlet inside the tank; and
   a compressed gas cartridge coupled to the inlet valve for selectively supplying gas into the drain outlet via the conduit and the first connector.

2. The sediment buster according to claim 1, wherein the main body is configured to be used as the drain port for the tank of the water heater.

* * * * *